United States Patent
Kwon et al.

(10) Patent No.: US 7,782,994 B2
(45) Date of Patent: *Aug. 24, 2010

(54) INHIBITOR OF LEAD-INDUCED STRESS CORROSION CRACKING COMPRISING NICKEL BORIDE IN SECONDARY SIDE OF STEAM GENERATOR TUBES IN NUCLEAR POWER PLANTS AND INHIBITION METHOD USING THE SAME

(75) Inventors: Oh-Chul Kwon, Taejeon-si (KR);
Yong-Sun Yi, Daejon-si (KR);
Hong-Pyo Kim, Daejeon-shi (KR);
Joung-Soo Kim, Daejeon-shi (KR)

(73) Assignees: Korea Atomic Energy Research Institute, Daejeon (KR); Korea Hydro & Nuclear Power Co. Ltd., Seoul (KR)

( * ) Notice: Subject to any disclaimer, the term of this patent is extended or adjusted under 35 U.S.C. 154(b) by 617 days.

This patent is subject to a terminal disclaimer.

(21) Appl. No.: 11/726,932

(22) Filed: Mar. 23, 2007

(65) Prior Publication Data

US 2008/0093584 A1   Apr. 24, 2008

(30) Foreign Application Priority Data

Oct. 19, 2006   (KR) ...................... 10-2006-0101769

(51) Int. Cl.
*C23F 11/06* (2006.01)
*B05D 1/00* (2006.01)

(52) U.S. Cl. ........................ 376/305; 148/279; 148/555; 148/675; 427/435; 427/436; 427/438; 252/387; 252/397

(58) Field of Classification Search ................ 376/305; 148/279, 555, 675, 676; 976/DIG. 187, DIG. 199; 427/239, 287, 405; 134/22.11, 22.12, 22.13; 138/97

See application file for complete search history.

(56) References Cited

U.S. PATENT DOCUMENTS

| 2,726,170 | A | * | 12/1955 | Warf et al. .................. 427/229 |
| 5,231,959 | A | * | 8/1993 | Smietana .................. 123/90.12 |
| 5,236,788 | A | * | 8/1993 | Manier et al. ............... 428/626 |
| 5,879,818 | A | * | 3/1999 | Kinomura et al. ........... 428/636 |

(Continued)

FOREIGN PATENT DOCUMENTS

| KR | 1020020075525 | 10/2002 |
| KR | 100609590 | 7/2006 |

OTHER PUBLICATIONS

H.R. Copson, et al., Effect of Contaminants on Resistance to Stress . . . , Corrosion, vol. 21, No. 1, 1965.

(Continued)

*Primary Examiner*—Joseph D Anthony
(74) *Attorney, Agent, or Firm*—Lucas & Mercanti, LLP (57) ABSTRACT

This invention relates to an inhibitor of lead-induced stress corrosion cracking including nickel boride in the secondary side of steam generator tubes in nuclear power plants and an inhibition method using the same, and more particularly, to an inhibitor of lead-induced stress corrosion cracking, in which nickel boride is added to secondary side cooling water of the steam generator in an amount of 0.2~6 g/l, and to an inhibition method using the same. According to this invention, when the inhibitor of lead-induced stress corrosion cracking is added to the secondary side of the steam generator tube in nuclear power plants, stress corrosion cracking of the tubes, which occurs in the lead-containing neutral or caustic solution, and a crack growth rate are decreased, thus increasing elongation. Further, a stress corrosion cracking ratio is decreased, and therefore the stress corrosion cracking resistance of metal or alloy can be improved. Therefore, nickel boride can be usefully used as an inhibitor of lead-induced stress corrosion cracking of the steam generator tubes in nuclear power plants.

4 Claims, 6 Drawing Sheets

U.S. PATENT DOCUMENTS

2006/0215804 A1* 9/2006 Yi et al. ...................... 376/305
2009/0010377 A1* 1/2009 Yi et al. ...................... 376/305
2009/0252883 A1* 10/2009 Kim et al. ................... 427/436

OTHER PUBLICATIONS

Max Helie, Lead Assisted Stress Corrosion Cracking of Alloys 600, 690 and 800, (1993).

S.S. Hwang, et al., The Mode of Stress Corrosion Cracking . . . , Journal of Nuclear Materials, vol. 275, No. 28, 1999.

S. Suzuki, IGA Resistance of TT Alloy 600 and Concentration Behavior of Broached Egg . . . , Proceedings of the 5th International Symposium on Environmental . . . , vol. 861, 1991.

* cited by examiner

INHIBITOR OF LEAD-INDUCED STRESS CORROSION CRACKING COMPRISING NICKEL BORIDE IN SECONDARY SIDE OF STEAM GENERATOR TUBES IN NUCLEAR POWER PLANTS AND INHIBITION METHOD USING THE SAME

CROSS-REFERENCE TO RELATED APPLICATION

This application claims the benefit of Korean Patent Application No. 10-2006-101769, filed Oct. 19, 2006 in the Korean Intellectual Property Office, the disclosure of which is incorporated herein in its entirety by reference.

BACKGROUND OF THE INVENTION

1. Field of the Invention

The present invention relates to an inhibitor of lead-induced stress corrosion cracking in the secondary side of steam generator tubes in nuclear power plants, comprising nickel boride, and an inhibition method using the same.

2. Description of the Related Art

Generally, nickel alloys are widely known to be susceptible to corrosion damage, such as intergranular attack (IGA) or intergranular stress corrosion cracking (IGSCC), under caustic environments.

Further, after lead was reported to affect the stress corrosion cracking resistance of Inconel (Alloy) 600 in the 1960s [H. R. Copson and S. W. Dean, *Corrosion,* 21(1), 1, 1965], lead-induced stress corrosion cracking was observed in the secondary side of steam generator tubes during operation of nuclear power plants since the 1980s. Furthermore, in the steam generator of a Kori-2 nuclear power plant, Korea, cracking which is presumed to have been primarily induced by lead was also observed. Such lead-induced stress corrosion cracking is characterized in that transgranular stress corrosion cracking (TGSCC) is observed along with intergranular stress corrosion cracking (IGSCC), unlike the kind of cracking mode that occurs due to sulfides or under caustic environments without lead. As such, the cause of introducing a lead component, which gives rise to lead-induced stress corrosion cracking, into the secondary side of the steam generator are known to be metallic streaks left by the use of lead mallets, plant makeup water, condenser leaks, copper alloys in the feed streams, grease & lubricants, seals & gaskets, babbitt alloys, preservatives & paints, marking pencils, lead chromate tinting in polyethylene wrapping materials, brazes & solder used on pipes, radiation shielding materials, etc. Typically, although the amount of lead supplied from the above materials is very small, lead may locally be concentrated at a high level ranging from hundreds to thousands of ppm or more in sludge deposited on tubesheets and in the niche between the tubes. In this way, the lead component, which is introduced into the secondary side of the steam generator and concentrated there, directly takes part in the steam generator tube, undesirably resulting in lead-induced stress corrosion cracking.

Inconel (Alloy) 600 may be susceptible to stress corrosion cracking in an acidic solution, a neutral solution and a caustic solution, and lead pollution functions to further accelerate stress corrosion cracking [(M. Helie, "Lead Assisted Stress Corrosion Cracking of Alloys 600, 690 and 800", Proceeding of the $6^{th}$ International symposium on environmental degradation of materials in nuclear power systems-water reactors, San Diego, Calif., August 1-5 179, 1993), (S. S. Hwang, H. P. Kim, D. H. Lee, U. C. Kim and J. S. Kim, "The mode of Stress Corrosion Cracking in Ni-base alloys in High Temperature Water Containing Lead", *Journal of Nuclear Materials,* 275, 28, 1999)], and thus may result in fatal damage to steam generator tubes.

After the first report, in which not IGSCC but TGSCC occurs in Inconel 600 in hot water containing lead [H. R. Copson and S. W. Dean, *Corrosion,* 21(1), 1, 1965], it was reported that conditions able to induce the most stress corrosion cracking in the Inconel 600 due to lead are the temperature ranging from 300° C. to 350° C. and the pH about 10 [S. Suzuki, "IGA resistance of TT Alloy 600 and concentration behavior of broached egg crate support construction", Proceedings of the $5^{th}$ International Symposium on Environmental Degradation of Materials in Nuclear Power Systems-Water Reactors, Monterey, 861, 1991], and also that the most extreme cracking is caused by addition of lead in the form of PbO, among pure Pb powder, PbO, $PbCl_2$, $Pb_3(PO_4)_2$, and $PbSO_4$.

One of the accidents occurring in the steam generator tubes due to the lead-induced stress corrosion cracking is the leakage of primary side cooling water contaminated with radioactive material to the secondary, which is considered to be a direct factor leading to the unscheduled stoppage of operation of nuclear power plants, repair of damaged steam generator tubes, or exchange of steam generators themselves, thereby causing considerable economic loss. Further, an impurity concentration in sludge piled on the top of tubesheet during operation and in the niches between the steam generator tubes, and thus highly caustic or neutral conditions are formed, resulting in stress corrosion cracking of the tubes. Furthermore, attributable to lead supplied through various routes, corrosion damage of the tubes may be further accelerated. Therefore, in order to inhibit or prevent stress corrosion cracking damage to the steam generator tubes during operation, a lot of research effort has been directed toward inhibitors or methods of inhibiting stress corrosion cracking in the secondary side. The conventional inhibitor of stress corrosion cracking is exemplified by $TiO_2$, $TiB_2$, $CeB_6$, and $LaB_6$. In the case of $TiO_2$, it was applied onsite in practice to power plants.

Korean Patent No. 415265 discloses a method of inhibiting stress corrosion cracking in the secondary side of steam generator tubes in nuclear power plants, in which a compound selected from the group consisting of cerium boride, lanthanium boride and mixtures thereof is supplied to secondary cooling water. This method can increase the resistance to stress corrosion cracking of the tubes three times or more compared to other methods, and two times or more compared to conventional corrosion inhibitors, such as boric acid and titanium oxides. In addition, as disclosed in Korean Patent No. 609590, nickel boride can reduce the incidence of stress corrosion cracking of a test specimen simulating a steam generator tube in a nuclear power plant under a highly caustic conditions compared to a reference solution, and can decrease the corrosion current density and the thickness of oxide film to thus increase corrosion resistance. In the present invention, disclosed are an inhibitor of lead-induced stress corrosion cracking in the secondary side of steam generator tubes in nuclear power plants, comprising nickel boride, capable of inhibiting lead-induced stress corrosion cracking in the secondary side of steam generator tubes in nuclear power plants, and an inhibition method using the same.

However, the above conventional techniques do not mention a method of inhibiting lead-induced stress corrosion cracking in the secondary side of steam generator tubes in nuclear power plants, comprising supplying nickel boride as an inhibitor of stress corrosion cracking of steam generator tubes to a secondary side cooling water system in nuclear power plants.

SUMMARY OF THE INVENTION

Accordingly, leading to the present invention, intensive and thorough research into inhibitors and methods capable of effectively inhibiting intergranular attack and stress corrosion cracking in the secondary side of steam generator tubes in nuclear power plants, carried out by the present inventors aiming to avoid the problems encountered in the related art, resulted in the finding that nickel boride can reduce the incidence of stress corrosion cracking of steam generator tubes in a lead-containing secondary side environment in nuclear power plants, and thus can be effectively used to inhibit lead-induced stress corrosion cracking in the secondary side of steam generator tubes in nuclear power plants.

Therefore, an object of the present invention is to provide an inhibitor of lead-induced stress corrosion cracking in the secondary side of steam generator tubes in nuclear power plants, comprising nickel boride.

Another object of the present, invention is to provide a method for inhibiting lead-induced stress corrosion cracking in the secondary side of steam generator tubes in nuclear power plants, comprising supplying nickel boride to a secondary side cooling water system as an inhibitor of lead-induced stress corrosion cracking.

In order to accomplish the above objects, the present invention provides an inhibitor of lead-induced stress corrosion cracking comprising nickel boride in the secondary side of steam generator tubes in nuclear power plants, and an inhibition method using the same.

BRIEF DESCRIPTION OF THE DRAWINGS (a) and (b) of FIG. 1 illustrate optical micrographs of the cross-section of C-ring specimens having cracks formed therein after a stress corrosion cracking test of the C-ring sample in a lead-containing caustic solution, depending on whether nickel boride was added or not, in which a reference solution comprising 40% sodium hydroxide and lead oxide (5,000 ppm) is used in FIG. 1(a), and the reference solution with nickel boride, comprising a reference solution and nickel boride (2 g/l), is used in FIG. 1(b).

(a), (b) and (c) in FIG. 4 are photographs illustrating the fracture surfaces of the specimens where lead-induced stress corrosion cracking occurred after slow strain rate tensile tests in the neutral solutions, in which a solution comprising ultrapure deionized water and lead oxide (10,000 ppm) is used in FIG. 4(a), a solution comprising ultrapure deionized water, lead oxide (10,000 ppm) and nickel boride (2 g/l) is used in FIG. 4(b), and a solution comprising ultrapure deionized water, lead oxide (10,000 ppm) and nickel boride (4 g/l) is used in FIG. 4(c), and in which 'SCC' designates a stress corrosion crack portion and 'ductile' designates a ductile portion.

(a), (b) and (c) in FIG. 5 illustrate the changes in elongation, stress corrosion cracking ratio, and crack growth rate, respectively, after the slow strain rate tensile tests in a neutral reference solution and the reference solutions with different amounts of nickel boride; and (a), (b) and (c) of FIG. 6 illustrate the relative ratio of nickel, iron and chromium, respectively, detected in the oxide film formed on the fracture surfaces at the crack tip after a slow strain rate tensile test in the neutral solutions.

DESCRIPTION OF THE PREFERRED EMBODIMENTS

Hereinafter, a detailed description will be given of the present invention.

The present invention provides an inhibitor of lead-induced stress corrosion cracking, which is supplied to secondary side cooling water in order to inhibit intergranular attack and lead-induced stress corrosion cracking in the secondary side of steam generator tubes of nuclear power plants, the inhibitor comprising nickel boride.

In the inhibitor of lead-induced stress corrosion cracking comprising nickel boride, according to the present invention, nickel boride is preferably added to the secondary side cooling water of the steam generator tubes in an amount of 0.2~6 g/l.

When the amount of nickel boride is less than 0.2 g/l, there is no effect of inhibiting lead-induced stress corrosion cracking in the secondary side of the steam generator tube. Conversely, when the amount exceeds 6 g/l, the effect of inhibiting lead-induced stress corrosion cracking in the secondary side of the steam generator tube does not increase further, despite the addition of such an amount.

The inhibitor comprising nickel boride, according to the present invention, can inhibit lead-induced stress corrosion cracking in the secondary side of the steam generator tubes, for example, stress corrosion cracking induced by lead, such as pure Pb powder, PbO, $PbCl_2$, $Pb(PO_4)$, or $PbSO_4$, but the present invention is not limited thereto.

In addition, the present invention provides a method of inhibiting corrosion and stress corrosion cracking in the secondary side of steam generator tubes in nuclear power plants, comprising supplying nickel boride to a secondary side cooling water system as an inhibitor of lead-induced stress corrosion cracking in the secondary side of the steam generator tubes.

In the method of inhibiting the lead-induced stress corrosion cracking, nickel boride is preferably circulated to form a protective film on the surface of the steam generator tubes. As such, nickel boride is added to the secondary side cooling water of the steam generator tubes in an amount of 0.2~6 g/l. Further, nickel boride may be added in the form of powder or a solution thereof.

The pH range of cooling water is from neutral to basic in a temperature range from room temperature to 330° C., and preferably the pH range is from 7.0 to 10.0 in a temperature range from room temperature to 330° C. As such, although the cooling water is not particularly limited, the use of ultrapure deionized water is preferable.

Below, the present invention is described in detail with reference to the drawings.

Figure 1:
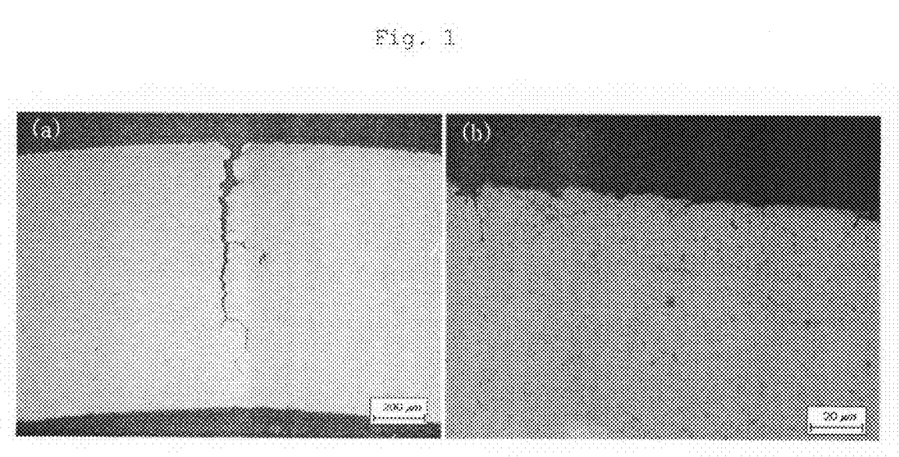

(a) and (b) of FIG. 1 illustrate the results of observation of stress corrosion cracking after the C-rings of Inconel (Alloy) 600 HTMA are immersed in the reference solution (40% aq. sodium hydroxide containing 5,000 ppm lead oxide) and in the reference solution with 2 g/l of nickel boride, respectively. In the case of the C-ring immersed in the reference solution, stress corrosion cracking occurred throughout the total thickness thereof. On the other hand, in the reference solution with nickel boride, very shallow stress corrosion cracking of about 20 μm was observed. Thereby, nickel boride can be confirmed to exhibit a lead-induced stress corrosion cracking inhibition effect.

Figure 2:
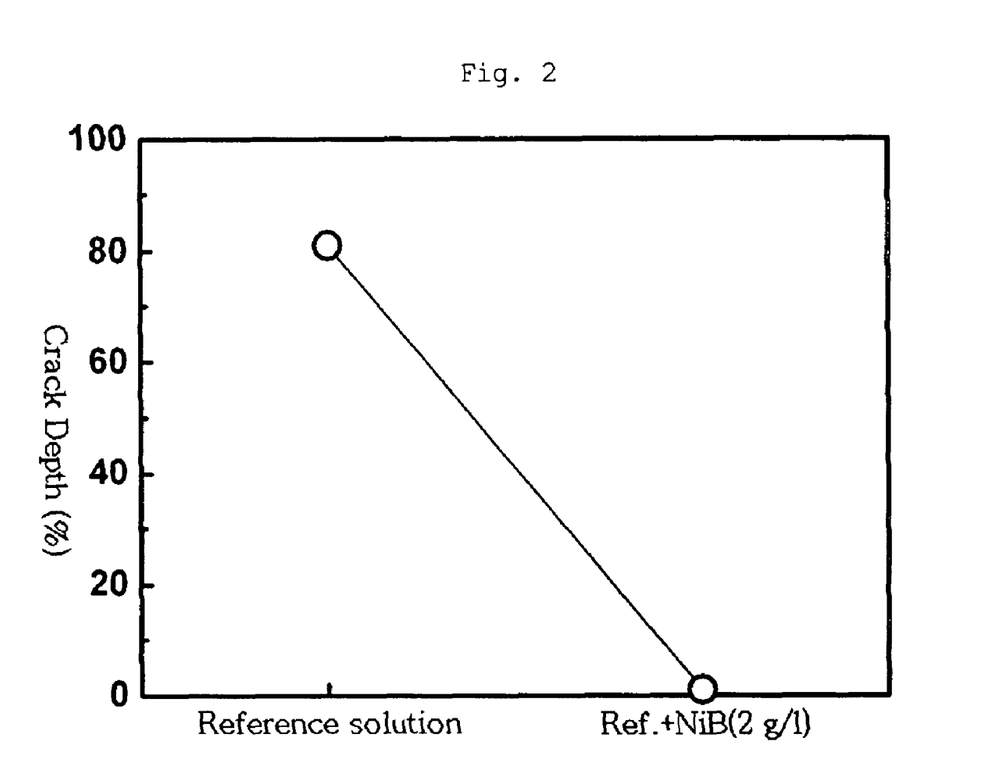
FIG. 2 is a graph illustrating the results of the inhibition effect of the inhibitor of stress corrosion cracking of the present invention in a lead-containing caustic solution, in which 'reference solution' designates a solution comprising 40% sodium hydroxide and lead oxide (5,000 ppm), and 'reference solution+nickel boride' designates the reference solution added with nickel boride (2 g/l)

FIG. 2 illustrates the depth of the stress corrosion cracks of the C-ring specimens, in which the crack depth is drastically decreased when using the reference solution with 2 g/l of nickel boride compared to when using the reference solution alone. Therefore, the inhibitor of stress corrosion cracking of the present invention can be seen to be reliably effective for corrosion inhibition.

Figure 3:
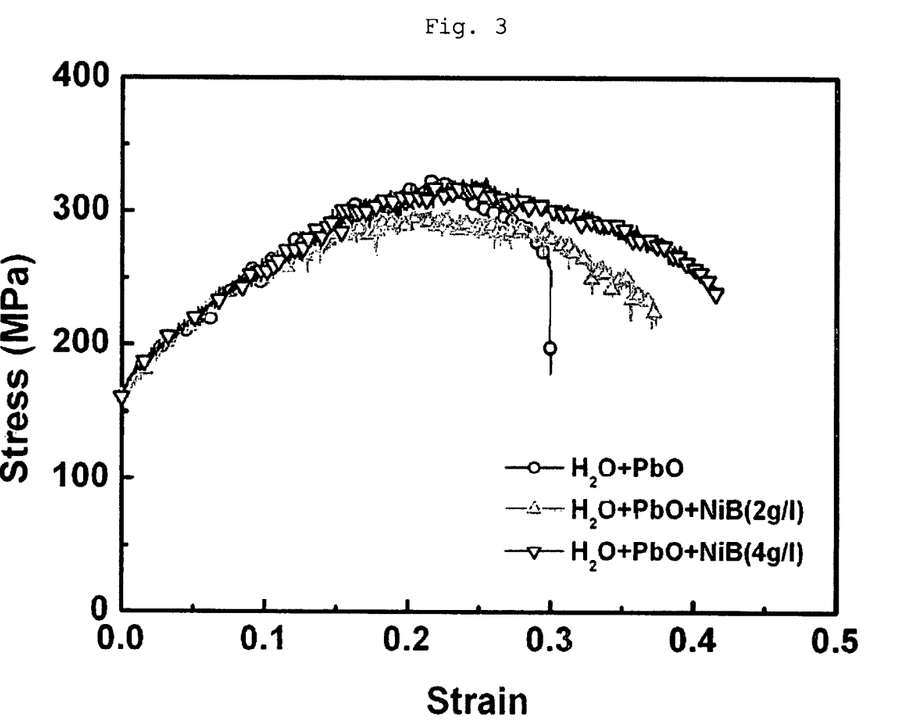
FIG. 3 illustrates stress-strain curves obtained after slow strain rate tensile tests in neutral solutions, in which '$H_2O$+PbO' designates a solution comprising ultrapure deionized water and lead oxide (10,000 ppm), '$H_2O$+PbO+NiB (2 g/l)' designates a solution comprising ultrapure deionized water, lead oxide (10,000 ppm) and nickel boride (2 g/l), and '$H_2O$+PbO+NiB(4 g/l)' designates a solution comprising ultrapure deionized water, lead oxide (10,000 ppm) and nickel boride (4 g/l)

FIG. 3 illustrates the stress-strain curves of tensile specimens after slow strain rate tensile tests. In this case, the elongation, which is 30% in a reference solution comprising ultrapure deionized water and lead oxide ($H_2O+PbO$), can be seen to gradually increase in the reference solutions respectively added with 2 g/l and 4 g/l of nickel boride as a corrosion inhibitor.

Figure 4:
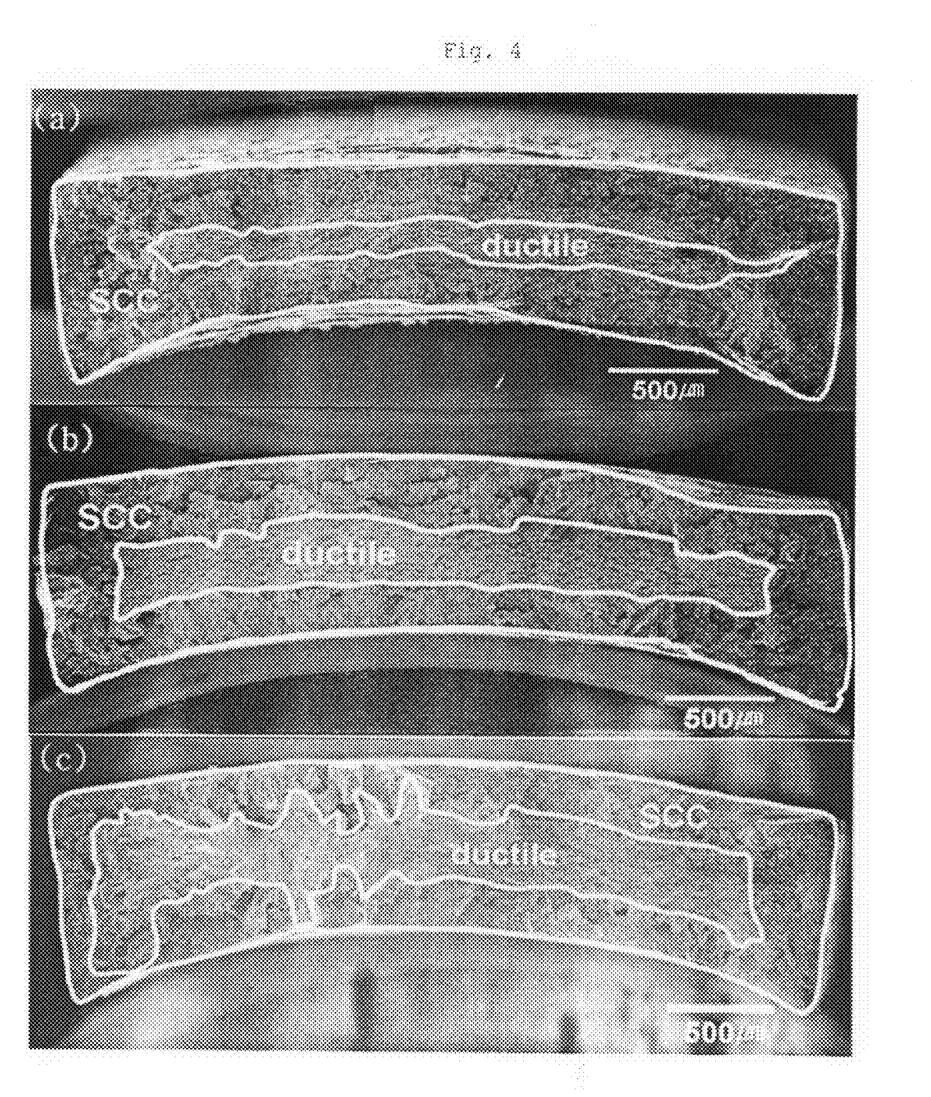

(a) to (b) of FIG. 4 illustrate photographs of the fracture surfaces of the specimens after slow strain rate tensile tests, taken with a scanning electron microscope (SEM). Although lead-induced stress corrosion cracking is observed on the fracture surfaces under all conditions, lead-induced stress corrosion cracking can be seen to gradually decrease upon the addition of nickel boride.

Figure 5:
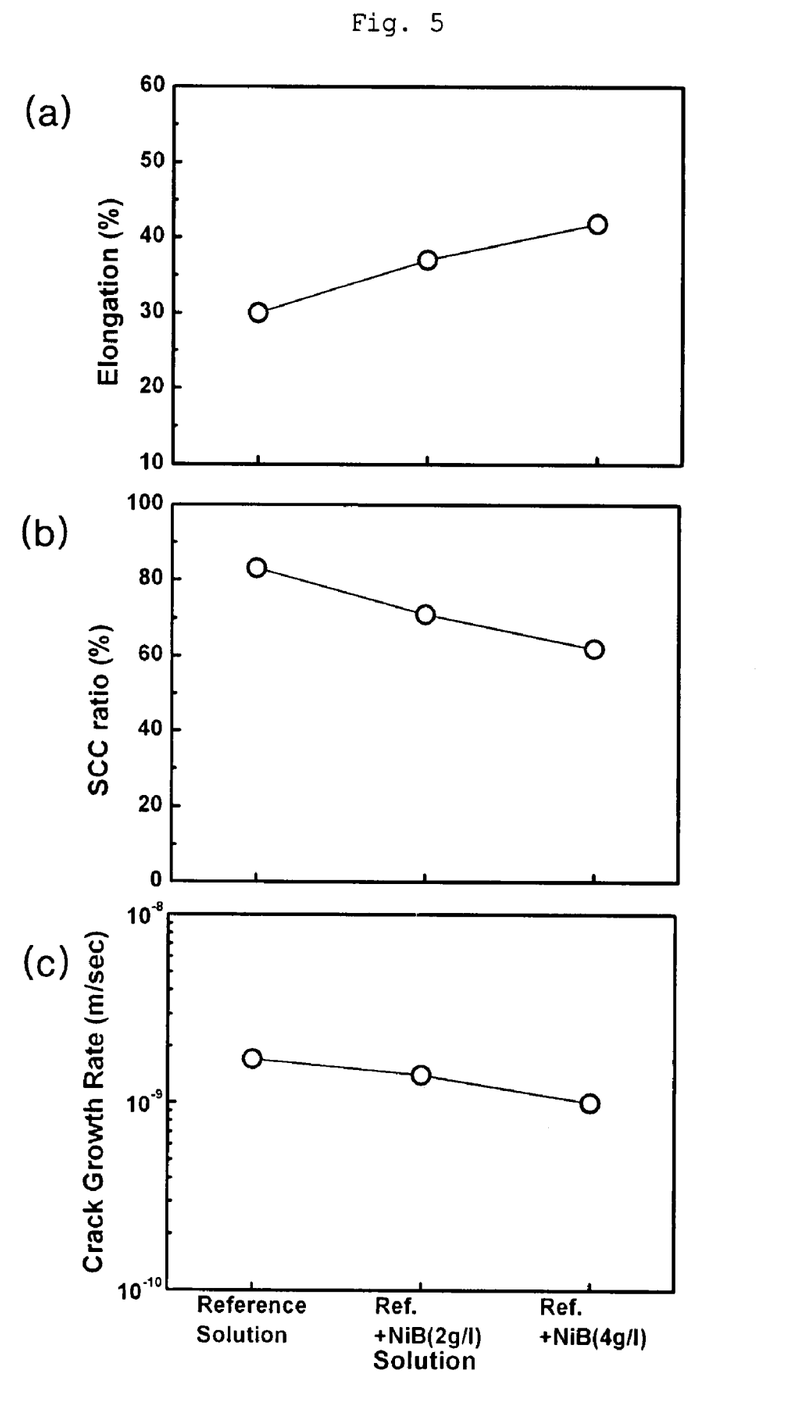

(a) to (b) of FIG. 5 illustrate elongation, a stress corrosion cracking ratio, and a crack growth rate, respectively, determined from the SSRT specimens tested in different solutions. When the amount of nickel boride to be added to the reference solution is increased, elongation is increased while the changes in stress corrosion cracking ratio and crack growth rate are decreased, thus improving the stress corrosion cracking resistance of the specimen.

Figure 6:
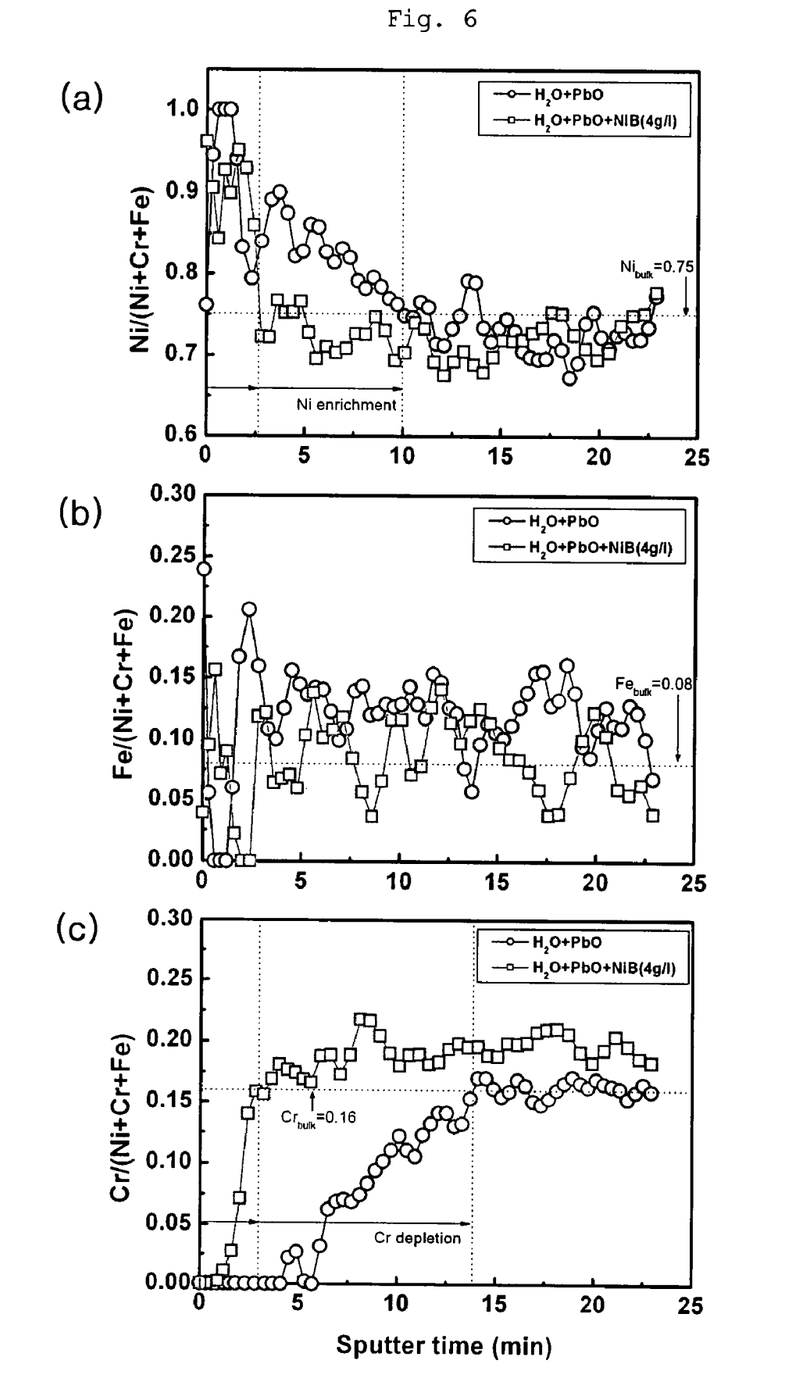

(a) to (b) of FIG. 6 illustrate the results of analysis of nickel, iron and chromium, respectively, in the composition of oxide film formed at the crack tip using an Auger electron microscope (AES). In a reference solution alone and a reference solution with 4 g/l of nickel boride, nickel was enriched toward the outer layer of the oxide film, and the distribution of iron was slightly higher than the nominal composition of Inconel alloy 600 but was not much different from the reference solution. On the other hand, chromium was seen to have slightly different trends in the two solutions. Although chromium was depleted in the outer layer of the oxide film in both solutions, there was a large difference in the depleted region. In the case where 4 g/l of nickel boride was added, the depleted region was remarkably decreased to about ⅓ compared to the chromium-depleted region in the reference solution. From this, it was confirmed that nickel boride decreases the chromium-depleted region, thereby improving resistance to lead-induced stress corrosion cracking, resulting in corrosion inhibition effects.

A better understanding of the present invention may be obtained in light of the following examples which are set forth to illustrate, but are not to be construed to limit the present invention.

Example 1

Effect of Nickel Boride on Lead-Induced Stress Corrosion Cracking of Steam Generator Tube In order to evaluate the effect of nickel boride on lead-induced stress corrosion cracking of Inconel (Alloy) 600HTMA (NX8524) used for a steam generator tube in a nuclear power plant, C-ring specimens were manufactured from the tube, and a stress corrosion cracking test was performed under a strong caustic condition. The manufactured C-ring specimens were subjected to a stress corrosion cracking test using a slow strain rate tensile (SSRT) test technique. In addition, for testing lead-induced stress corrosion cracking in the caustic or neutral solution, a strong caustic solution of 40% sodium hydroxide or a neutral aqueous solution of ultrapure deionized water (18 MΩcm), containing 10,000 ppm lead oxide (PbO), was used.

Example 1-1

Measurement of Lead-Induced Stress Corrosion Cracking in Basic Solution Using C-Ring C-ring specimens were made of Inconel 600HTMA, used as steam generator tubes in nuclear power plants, and were then subjected to stress corrosion cracking tests.

The chemical composition of Alloy 600HTMA is shown in Table 1 below. The C-ring specimens made from Alloy 600HTMA tubes had a diameter of 19.05 mm and a thickness of 1.09 mm, and were used without particular heat treatment.

TABLE 1

| Chemical Composition of Alloy 600HTMA (wt %) | | | | | | | | | | | | | |
|---|---|---|---|---|---|---|---|---|---|---|---|---|---|
| | C | Si | Mn | P | Cr | Ni | Fe | Co | Ti | Cu | Al | B | S | N |
| Alloy 600HTMA | 0.025 | 0.05 | 0.22 | 0.07 | 15.67 | 75.21 | 8.24 | 0.005 | 0.39 | 0.011 | 0.15 | 0.0014 | 0.001 | 0.0103 |

The C-ring specimens were manufactured according to ASTM (American Society for Testing and Material) G38-01 standards, specifying the application of stress corresponding to 150% of room-temperature yield strength. Subsequently, the C-ring specimens were immersed in a caustic solution and then subjected to a stress corrosion cracking test using an autoclave. The stress corrosion cracking test was performed at 315° C. for 72 hours using a reference solution (a solution of 40% aq. sodium hydroxide added with 5,000 ppm lead oxide) alone in FIG. 1(a) and a reference solution added with 2 g/l of nickel boride in FIG. 1(b). For the removal of dissolved oxygen from the reaction vessel, the vessel was deaerated using highly pure nitrogen for 1 hour. Finally, a cover gas comprising 5% $H_2$ and 95% $N_2$ was injected to 200 psi for pressurization. With the goal of accelerating crack propagation, using a potentiostat/galvanostat (model 363, available from EG&G), potential of 200 mV (vs. OCP) for the corrosion potential of the material was applied to the specimen. As such, a nickel wire was determined to be a reference electrode, and the body of the autoclave was used as a count electrode. After the test temperature was maintained for 1 hour, the temperature of the solution was stabilized and then potential was applied. After completion of the test, the specimen was observed using an optical microscope. The results are shown in FIGS. 1 and 2.

As shown in FIG. 1, the C-ring was immersed in each of the reference solution alone and the reference solution added with 2 g/l of nickel boride to thus perform a stress corrosion cracking test, after which the cross section of the C-ring was observed using an optical microscope. In the case of the C-ring specimens immersed in the reference solution, stress corrosion cracking occurred throughout the total thickness of the C-ring. However, in the solution with nickel boride, very shallow stress corrosion cracks of about 20 µm was observed. Thereby, nickel boride was confirmed to exhibit a lead-induced stress corrosion cracking inhibition effect.

As shown in FIG. 2, the crack depth was drastically decreased when using the reference solution added with 2 g/l of nickel boride compared to when using the reference solution alone. Therefore, the effect of the stress corrosion cracking inhibitor of the present invention could be seen to be reliable.

Example 1-2

Lead-Induced Stress Corrosion Cracking Test in Neutral Pure Deionized Water Solution Using SSRT Test Technique The lead-induced stress corrosion cracking test was performed in a neutral solution using an SSRT test technique. The SSRT technique, which is a testing method of stress corrosion cracking while maintaining the tensile strain rate uniform, is based on a principle in which a stress corrosion cracking process depends on plastic strain of material, and is advantageous because a period of time required for the evaluation of resistance to stress corrosion cracking can be shortened, and also because the reproducibility of the test results is superior, compared to other test techniques. For test, the alloy 600HTMA was subjected to a stress corrosion cracking test under conditions of high temperature and high pressure using an Ni-autoclave having a capacity of 0.5 gallon. The tensile specimen underwent electric discharge machining so as to have a gauge width of 4 mm and a gauge length of 25.4 mm. For the lead-induced stress corrosion cracking test in a neutral solution, an immersion process using an aqueous solution of ultrapure deionized water (18 MΩcm) and 10,000 ppm lead oxide (PbO) as a reference solution, a solution comprising the reference solution added with 2 g/l of nickel boride, and a solution comprising the reference solution added with 4 g/l of nickel boride was carried out. As background information, the maximum solubility of lead oxide in pure deionized water is known to be about 350 ppm [D. Feron, I. Lambert, Proceeding of 12$^{th}$ International conference on properties of water and steam. September 12-15, Orlando, Fla., USA, 1994]. Since the solubility of lead oxide is increased in proportion to an increase in temperature, in the present invention, the maximum solubility of lead oxide is expected to be hundreds of ppm or higher. Therefore, a large amount of lead oxide was added to thus prepare a completely saturated lead aqueous solution. Before the temperature was increased, dissolved oxygen in the reaction vessel was removed using highly pure nitrogen for 24 hours. The SSRT test was performed at a tensile strain rate of $2 \times 10^{-7}$/sec at 315° C. Further, in order to simulate the environments of actual nuclear power plants, potential was not applied to the tensile specimen, and the test was conducted at a corrosion potential. After the SSRT test, the fracture surface was observed using an SEM (model: JSM 6300, available from JEOL), and the stress corrosion cracking ratio was determined as an area ratio of an area cracked by stress corrosion relative to the total surface area of the fracture surface (SCC ratio, $A_{SCC}/A_{total}$) [Seizaburo Abe, Masao Kojima and Yuzo Hosoi, "Stress Corrosion Cracking the Slow Strain Rate Technique", ASTM STP-665, 294, (1997)]. The crack growth rate (CGR) was calculated from the area of stress corrosion cracking according to Equation 1 below [T. Yonezawa, "A Round Robin Test and EAC Behavior of Alloy 600", ECG-EAC meeting, Toronto, (1996)]. The results are shown in FIGS. 3, 4A to 4C, and 5A to 5C.

$$\text{Crack Growth Rate} = \frac{\text{Stress Corrosion Crack/Sample Thickness}}{\text{Exposure Time}} \quad <\text{Equation 1}>$$

FIG. 3 illustrates the stress-strain curve of the tensile specimen after the SSRT test. In the reference solution, comprising ultrapure deionized water and lead oxide ($H_2O$+PbO), elongation was merely 30%. However, in the solutions in which nickel boride acting as a corrosion inhibitor was added to the reference solution in respective amounts of 2 g/l and 4 g/l, elongation could be seen to gradually increase.

FIG. 4 is a photograph illustrating the fracture surfaces after the SSRT tests, which were taken with an SEM. Although the lead-induced stress corrosion cracking was observed to occur under all conditions, lead-induced stress corrosion cracking was seen to decrease somewhat when nickel boride was added.

As shown in FIG. 5, when the amount of nickel boride to be added to the reference solution was increased, the elongation was increased, and the changes in stress corrosion cracking ratio and crack growth rate were decreased, thus enhancing the stress corrosion cracking resistance of the Alloy 600 HTMA specimen.

Example 1-3

Analysis of Composition of Oxide Film at Crack Tip

After the SSRT test, the chemical composition of the oxide film formed at the crack tip was analyzed using AES.

Using a PHI 680 Auger nanoprobe, an acceleration voltage was 5 kV, and current was 15~20 nA. The sputtering speed was 173 Å/min based on silicon dioxide ($SiO_2$). The relative ratio of nickel (Ni), chromium (Cr) and iron (Fe), which are main alloying elements of the alloy 600 HTMA specimens, was determined. The results are shown in FIGS. 6(a) to 6(c).

As shown in FIG. 6, nickel (FIG. 6(a)) was enriched toward the outer layer of the oxide film in a neutral reference solution alone and in the reference solution to which 4 g/l of nickel boride was added. Although the distribution of iron (FIG. 6(b)) was slightly higher than the fundamental composition of alloy 600HTMA, it was not very different from the reference solution. However, chromium (FIG. 6(c)) had slightly different trends in the two solutions. That is, although chromium was depleted in the outer layer of the oxide film formed on the specimens tested in both solutions, there was a large difference in the depleted zone. Upon the addition of 4 g/l of nickel boride, the depleted zone was considerably decreased to about ⅓ compared to the chromium-depleted zone in the reference solution. Thereby, it was noted that nickel boride could reduce the chromium-depleted zone to thus improve resistance to lead-induced stress corrosion cracking, resulting in lead-induced stress corrosion cracking inhibition effects.

As is apparent from Examples 1-1 to 1-3, nickel boride was confirmed to inhibit lead-induced stress corrosion cracking in the caustic solutions and the neutral solutions.

As described hereinbefore, the present invention provides an inhibitor of lead-induced stress corrosion cracking comprising nickel boride in the secondary side of steam generator tubes in nuclear power plants, and an inhibition method using the same. According to the present invention, when the inhibitor of lead-induced stress corrosion cracking comprising nickel boride is added to the secondary side cooling water of the steam generator tube, lead-induced stress corrosion cracking of the steam generator tubes, which occurs in the lead-containing neutral or caustic solution, is decreased. Further, elongation is increased, and a stress corrosion cracking ratio is lowered, thus improving the resistance to stress corrosion cracking. Thereby, nickel boride can be usefully used as an inhibitor of lead-induced stress corrosion cracking of the steam generator tubes in nuclear power plants.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of inhibiting lead-induced stress corrosion cracking suitable for inhibiting intergranular attack and stress corrosion cracking in a secondary side of a steam generator tube in a nuclear power plant, the method comprising supplying nickel boride in an amount of 0.2~6 g/l to a secondary side cooling water system as an inhibitor of lead-induced stress corrosion cracking in the secondary side of the steam generator tube.

2. The method as set forth in claim 1, wherein the nickel boride is circulated to form a protective film on the surface of the steam generator tube of the nuclear power plants.

3. The method as set forth in claim 1, wherein the pH range of cooling water is from neutral to caustic in a temperature range from room temperature to 330° C.

4. The method as set forth in claim 3, wherein the pH range of feedwater is from 7.0 to 10.0 in a temperature range from room temperature to 330° C.

* * * * *